H. S. Shepardson,
Cutlery Scourer.
N° 50,779.                    Patented Oct. 31, 1865.
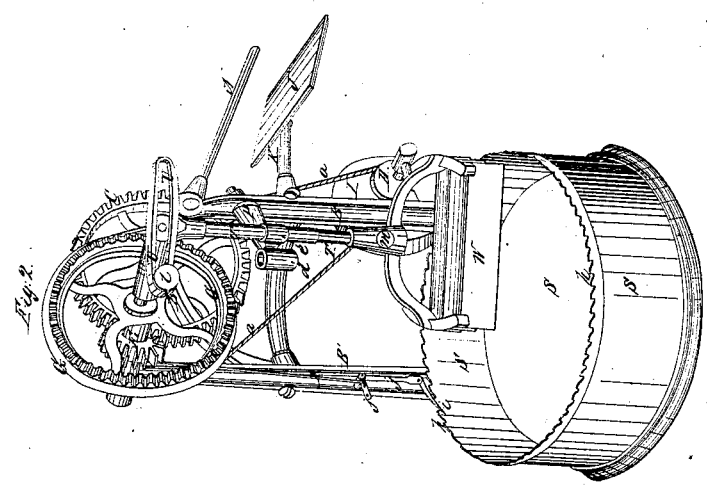
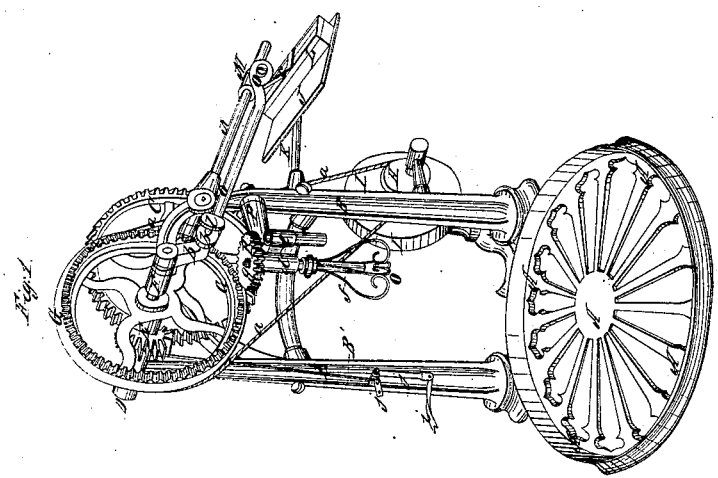
Witnesses:
Inventor:
Henry S. Shepardson 2 Sheets—Sheet 2.
H. S. Shepardson,
Cutlery Scourer.
N° 50,779. Patented Oct. 31, 1865.
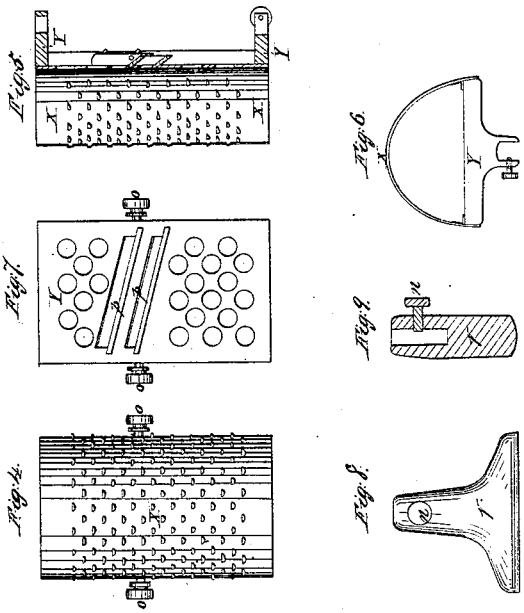
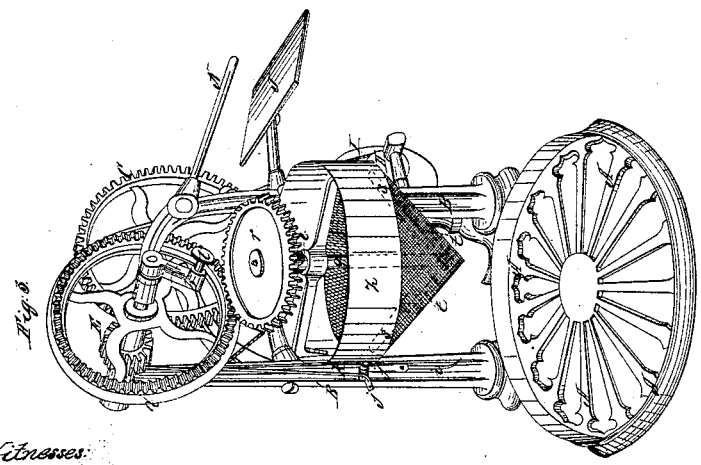
Witnesses:
Inventor:
Henry S. Shepardson,
By atty A. B. Stoughton

UNITED STATES PATENT OFFICE.

HENRY S. SHEPARDSON, OF SHELBURNE FALLS, MASSACHUSETTS, ASSIGNOR TO H. S. SHEPARDSON & CO., OF SAME PLACE.

IMPROVEMENT IN MACHINES FOR FACILITATING HOUSEHOLD AND CULINARY OPERATIONS.

Specification forming part of Letters Patent No. 50,779, dated October 31, 1865.

*To all whom it may concern:*

Be it known that I, HENRY S. SHEPARDSON, of Shelburne Falls, in the county of Franklin and State of Massachusetts, have invented a certain new and useful improvement in machines for scouring and grinding knives, cutting and mashing meat and vegetables, and for mixing and sifting or separating various household and kitchen articles; and I do hereby declare the following to be a full, clear, and exact description of the same, reference being had to the accompanying drawings, making a part of this specification, in which—

Figure 1 represents the machine in perspective, and as adapted for scouring or grinding knives and beating eggs or mixing liquids or fluids of any kind. Fig. 2 represents, in perspective, the machine as adapted to the cutting of sausage-meat and similar things. Fig. 3 represents, in perspective, the machine as adapted to the sifting of flour or other substances. Figs. 4, 5, 6, 7, 8, and 9 represent different views of other devices that may be used on the machine for other purposes—viz., for grating, slicing, and mashing such fruits, spices, or vegetables as it may be desirous of so treating.

Similar letters of reference where they occur in the several separate figures denote like parts of the machine in all the drawings.

My invention relates to a certain construction and arrangement of a base or table, supporting columns, or their equivalents, and suitable gearing mounted thereon, so that the several hereinafter-mentioned household and kitchen or culinary purposes may be accomplished by the interchangeable appliances to be described, while the vessels to contain the articles acted upon may stand on the same base, table, or support.

To enable others skilled in the art to make and use my invention, I will proceed to describe the same with reference to the drawings.

A represents a base, table, stand, or support, which I prefer to make of cast metal, and from this base and near to each other rise two columns, B B', upon which the gearing for operating the several devices used is affixed, supported, and operated as follows: On a shaft suitably supported in or on the columns B B' there is placed a cog-gear wheel, C, which turns with the shaft by means of a crank, as at D, or otherwise. The cog-wheel C gears into a pinion, E, on a shaft, F, and thus the shaft F is revolved. On the shaft F there is a bevel-gear, G, and in the rim of this gear there is a groove made to receive an endless belt or band, a, which band also passes around a pulley, H, on a shaft that carries a rubber or other emery-wheel I, which is or may be used for grinding or sharpening knives.

An arm, K, projects from the column B, which supports an inclined or other table, J, on which knives may be scoured by means of a rubbing-block, L, with any polishing powder or dust upon it, as follows: M is a sleeve or boss, which is moved back and forth on a guide rod or arm, N, fixed to the column B by means of the connecting rod or pitman O, one end of which is attached to the sleeve M and the other end to the crank b on the end of the shaft F. The pitman is readily attached and detached by means of a thumb-screw, l, and the block L may be connected to the sleeve M by a spring-arm, c, so that while the scouring-block is held down to the table J it may still yield to the varied thickness of the different articles subjected to it.

There is another arm, P, projecting from the column B, which supports two sleeves, d e, designed for receiving shafts that are to be turned. In Fig. 1 a shaft, f, passes up through the sleeve d, and upon a screw, g, cut upon the upper end of said shaft, a bevel-pinion, R, is screwed, which gears into the bevel-teeth of the wheel G. The lower end of the shaft f has wires Q attached to it, for the purpose of beating up eggs, cream, or any other material, the bowl, tumbler, or other vessel containing the articles to be thus beaten being placed on the table or base A. The object of the screw g as a fastening for the bevel-gear R is that, by running the gearing in one direction (its working direction) the screw runs itself into the pinion, and by reversing the motion of the machine it runs itself out, thus making a very easy connecting and disconnecting mechanism.

On the shaft F there is a cam, over which a rod, k, works, the lower end of said rod being attached to a bell-crank, j, pivoted to the column B. To the bell-crank is fastened a pawl, i, which works in ratchet-teeth h on a tub or vessel, S, Fig. 2, for turning said vessel under a meat-cutting or vegetable-crusher, as will be explained, said tub or vessel standing and turning upon the base or table A.

Fig. 2 represents the machine as adapted to the cutting of sausage or minced meats, &c., as follows: The knife, scourer, and beater having been removed, and the shafts, crank, and pinion that operates them, a stem, T, having a slotted head, U, is placed in the sleeve or boss c, and the slotted head placed over the crank b on the shaft F and held there by the screw-pin l, so that as the crank revolves the stem T shall have a vertical reciprocating motion. On the lower end of the stem T there is secured by a socket and set-screw, m, a set of chopping-knives, W, which cut against or close to the bottom of the vessel S, which part of it should be of wood, and as the vessel is turned by the pawl and ratchet the material to be cut or chopped is brought around under the action of the cutters.

Fig. 3 represents the machine as adapted to the sifting of flour or other substances, as follows: The meat, &c., chopper having been removed, a shaft, q, is passed up through the sleeve e, and a bevel-pinion, r, is run onto its upper end by a screw-tap, as in the case and for the purpose of that (R) shown in Fig. 1. On the boss e is suspended, by a cross-head or otherwise, a sieve, Z, the bottom of which is made of wire-gauze t, of an inverted conical form, and on the lower end of the shaft q, within the sieve, are arms or stirrers, (shown by dotted lines s s,) which move the material to be sifted over the gauze or perforated bottom, while the vessel that is to catch the sifted material stands upon the common base or table A.

Figs. 4, 5, 6, and 7 represent different views of a grater and slicer, which may be applied to and operated by the stem T, the meat-chopper being detached therefrom. The grater X is of perforated sheet metal and secured to the frame Y by set-screws o o, so that it may be readily attached or detached from the frame, and in the frame Y are secured knives p p so that cutting or slicing may be done by it. This grater and slicer, when the machine is in operation, has a vertical reciprocating motion, and the material to be grated or sliced is held against the grater or slicer, as the case may be, while the detached portions may fall and be caught in a vessel placed on the base or table A.

Figs. 8 and 9 represent a masher, which may be used on the stem T, it having a socket and set-screw, n, by which it may be secured to the stem. This masher may work in the tub or vessel S for mashing potatoes or any other vegetables or roots.

The emery-wheel I, which is of the kind known as "rubber emery-wheels," may remain constantly attached to the machine or power, as it is a thing in almost daily demand for household purposes; and the machine in hotels or large houses will be found of very great assistance in culinary operations.

The object in placing the columns so near together and at the edge of the base or table, and bending them over at their upper ends toward the center of the base or table is that any vessel may be conveniently placed on the base and the devices work over such vessel.

Having thus fully described the nature, object, and purpose of my invention, what I claim is—

The general arrangement of the base, columns, and gearing, so that the base will serve to hold any vessel under the gearing, and the gearing be susceptible of driving the different devices herein named, while the devices themselves are interchangeable to accomplish the several purposes herein named, substantially as described.

H. S. SHEPARDSON.

Witnesses:
  H. A. MERRITT,
  JOHN V. GRIEBEL.